United States Patent [19]
Citta et al.

[11] Patent Number: 5,438,369
[45] Date of Patent: Aug. 1, 1995

[54] DIGITAL DATA INTERLEAVING SYSTEM WITH IMPROVED ERROR CORRECTABILITY FOR VERTICALLY CORRELATED INTERFERENCE

[75] Inventors: Richard W. Citta, Oak Park; Scott F. Halozan, Des Plaines, both of Ill.

[73] Assignee: Zenith Electronics Corporation, Glenview, Ill.

[21] Appl. No.: 931,177

[22] Filed: Aug. 17, 1992

[51] Int. Cl.[6] .................. H04N 7/015; H04N 7/64
[52] U.S. Cl. ...................... 348/470; 348/21; 348/608; 348/613; 348/611; 348/426; 370/6; 375/254
[58] Field of Search .............. 358/141, 13, 12, 142, 358/133, 167, 36, 83; 370/6, 18, 68; 375/34, 26, 60, 17, 18; 455/51, 63; H04N 7/00, 11/00, 5/213, 7/13; 348/470, 472, 487, 611

[56] References Cited

U.S. PATENT DOCUMENTS

| | | | |
|---|---|---|---|
| 5,043,805 | 8/1991 | Citta et al. | 358/83 |
| 5,083,206 | 1/1992 | Knauer et al. | 358/141 |
| 5,086,340 | 2/1992 | Citta et al. | 358/141 |
| 5,105,442 | 4/1992 | Wei | 375/34 |
| 5,128,756 | 7/1992 | Johnston et al. | 358/133 |
| 5,136,375 | 8/1992 | Citta et al. | 358/133 |
| 5,144,435 | 9/1992 | Knauer et al. | 358/167 |
| 5,151,785 | 9/1992 | Citta | 358/141 |
| 5,164,963 | 11/1992 | Lawrence et al. | 358/13 |
| 5,181,112 | 1/1993 | Citta et al. | 358/141 |
| 5,241,385 | 8/1993 | Halozan | 358/141 |
| 5,241,563 | 8/1993 | Paik et al. | 370/18 |
| 5,243,627 | 9/1993 | Betts et al. | 375/60 |

*Primary Examiner*—James J. Groody
*Assistant Examiner*—Safet Metjahic

[57] ABSTRACT

A digital data transmission system for signals in the areas of interference having a high degree of vertical correlation comprises a transmission frame including a plurality of vertically arranged repetitive horizontal data segments each including a fixed number of subsegments with symbols of individual subsegments being vertically correlated on different data segments. The vertically correlated symbols are further interspersed in the transmission frame for guarding against horizontally correlated burst noise. A Reed-Solomon correction system is incorporated for each data segment in the transmission frame.

20 Claims, 6 Drawing Sheets

DIGITAL DATA INTERLEAVING SYSTEM WITH IMPROVED ERROR CORRECTABILITY FOR VERTICALLY CORRELATED INTERFERENCE

CROSS REFERENCE TO RELATED APPLICATIONS

This invention is related to and is operable with apparatus disclosed and claimed in applications Ser. No. 894,388, filed Jun. 5, 1992, Ser. No. 204,972, filed Mar. 2, 1994, Ser. No. 931,176, filed Aug. 17, 1992, and U.S. Pat. Nos. 5,086,340, 5,260,793 and 5,181,112, all of which are incorporated herein by reference.

BACKGROUND OF THE INVENTION AND PRIOR ART

This invention relates generally to a digital data transmission system and specifically to the digital data transmission system incorporated in the Zenith/AT&T Digital Spectrum Compatible High Definition Television (DSC-HDTV) system recently tested by the Federal Communications Commission.

In the foregoing system, data is supplied in an input frame format comprising two and four level symbols arranged in repetitive data segments and then reformatted into a transmission frame. The two level symbols are more robust and are used to convey information that is of greater "importance". Two level symbols are better in terms of noise performance, but result in a reduced data rate. The input frame format comprises 12 data segments (DS) of two level symbols followed by 240 data segments of either two or four level symbols and nine data segments of four level symbols. The data is supplied in the form of two successive fields similar to, but otherwise unrelated to, the two successive fields in an NTSC system. A transmission bit map (TBM) is included in each field. The TBM consists of 15 bytes (120 bits), one for each of 120 data segment pairs, i.e. 120 groups of two contiguous data segments, or a total of 240 data segments. A TBM "1" bit indicates a segment pair of two level symbols and a "0" bit indicates a segment pair of four level symbols.

The symbol data is reconfigured into a transmission frame format for enhancing the ability of the data to withstand expected interference from NTSC as co-channel signals and to optimize signal robustness, i.e. its ability to be processed with minimum errors and maximum data rate. In addition to the expected interference from NTSC co-channel signals, conventional "burst+" noise, which tends to affect lines or segments of data, is likely to be encountered. NTSC signal interference tends to affect vertically aligned data in the transmission frame due to its strong vertical edge video content. The invention is directed to overcoming the effects of such vertically oriented interference. A conventional Reed-Solomon (R-S) byte correction code is incorporated in the data segments of the transmitted signal. Since the R-S system corrects bytes of data rather than symbols, the invention seeks to pack a number of symbol errors into a single byte of data (when the signal is reconfigured in the receiver) to maximize the R-S effectiveness.

OBJECTS OF THE INVENTION

A principal object of the invention is to provide an improved digital data transmission system for television signals.

Another object of the invention is to provide an error protection system and transmission format for an HDTV signal operating in the vicinity of NTSC co-channel signals.

A further object of the invention is to provide a system for transmitting an error protected digital HDTV signal in an environment including a high level of vertically oriented interference.

BRIEF DESCRIPTION OF THE DRAWINGS

These and other objects and advantages of the invention will be apparent upon reading the following description in conjunction with the drawings, in which:

FIG. 3 illustrates the arrangement of data segments into subsegments prior to interleaving;

FIG. 4 illustrates half-field interleaving of the subsegments to enhance their resistance to vertically oriented noise in accordance with the invention;

DESCRIPTION OF THE PREFERRED EMBODIMENT

Figure 1:
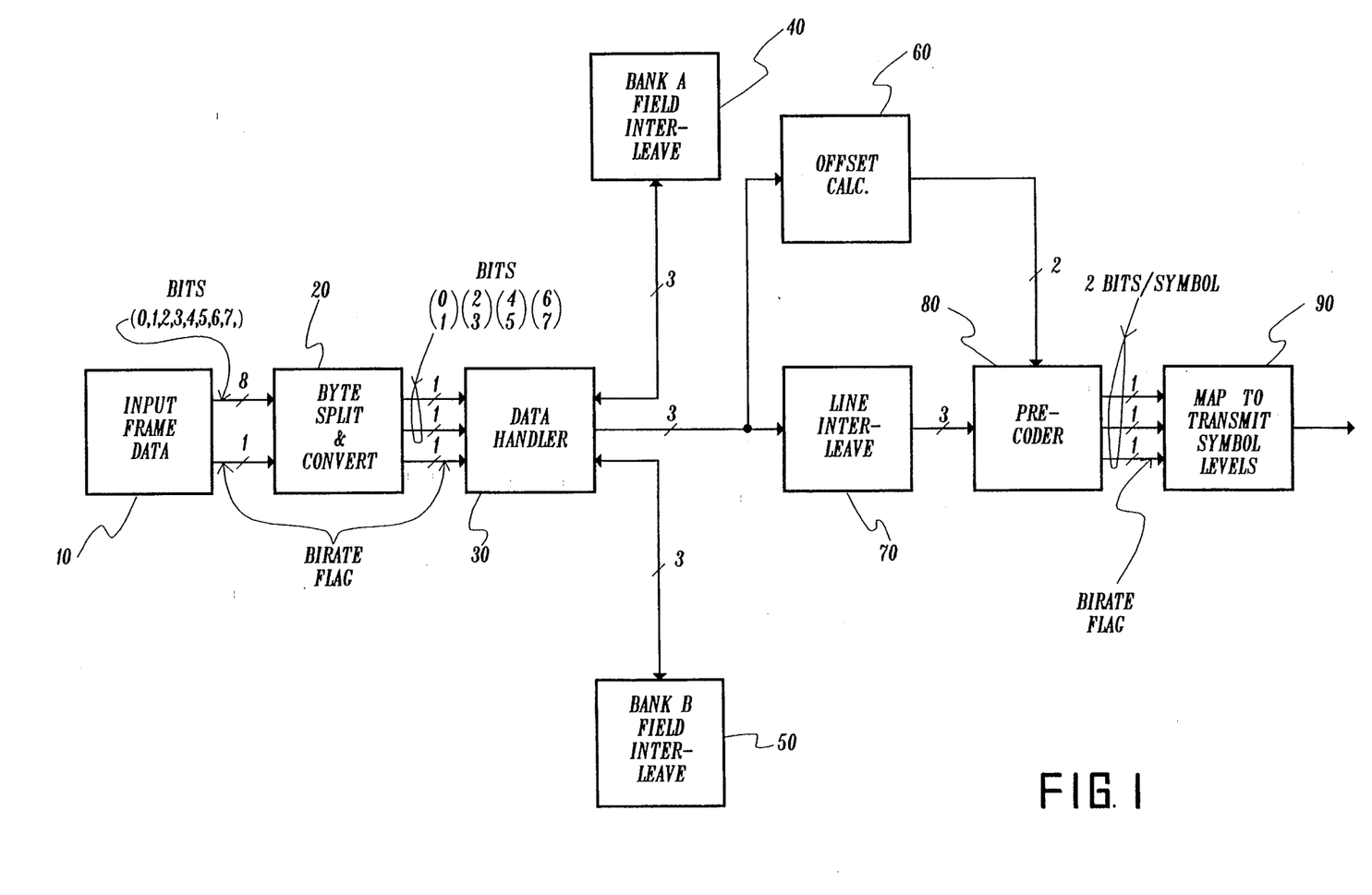
FIG. 1 is a simplified partial block diagram of a data transmission system constructed in accordance with the invention.

Referring to FIG. 1, a block diagram of a transmission system constructed in accordance with the invention is shown. An input frame data source 10 is coupled to a byte splitter and converter 20 by a pair of lines or buses. In accordance with conventional usage, an oblique slash mark intersecting a line or bus, and its accompanying number, indicates the number of conductors comprising the bus. Thus the oblique slash mark and the number 8 indicates that the upper bus comprises 8 conductors capable of supplying 8 bits of parallel data whereas the lower bus, marked with a 1, indicates that a single bit is supplied on a single conductor. The data bits on the 8 bit bus are numbered 0–7 and the bit supplied by the lower conductor is indicated as being a birate flag. The bits of each 8 bit data byte are divided or split into pairs in block 20 and the upper two output leads of block 20 develop the bit sequence indicated, e.g. bit numbers 7,6 appearing on the two leads followed by bit numbers 5,4 followed by bit numbers 3,2 and followed by bit numbers 1,0. The birate flag is a single bit that is conveyed over a single conductor. The birate flag identifies the accompanying pair of bits on the upper two output leads as representing a two level or a four level symbol. The bit pairs and the birate flag are applied to a data handler 30 which is in bidirectional communication with two half-field interleaving storage devices 40 and 50 labelled bank A field and bank B field, respectively. The bit pairs and the birate flag are applied to the interleaving devices 40 and 50 by data handler 30 in the format received from the byte splitter 20 and read out of the interleaving devices by data handler 30 in a field interleaved format with increased vertical orientation of the symbols (bit pairs) as will be discussed further. The two half-field interleaving banks A and B minimize the memory size that would be required for full field storage and interleaving. The restriction of interleaving on a half-field basis is a reasonable cost/performance tradeoff.

The output of data handler 30 (consisting of successive bit pairs and the associated birate flag) is applied to an offset calculator 60 and to a line interleaver 70. Line interleaver 70 functions to interleave the symbols of the subsegments of each segment as disclosed in U.S. Pat. No. 5,181,112 to facilitate the subsequent precoding operation. Offset calculator 60 analyzes the data supplied by data handler 30 in accordance with a predetermined algorithm to derive an offset factor for each subsegment which is applied to one input of a precoder 80. As more fully disclosed U.S. Pat. No. 5,181,112, the offset factor may, for example, be selected to positively offset (modulo N) the transmitted data for facilitating recovery of the transmitted signal by a suitable receiver. Precoder 80, whose second input is supplied by line interleaver 70, in addition to offsetting the symbols (bit pairs) of each subsegment in accordance with the derived offset factor, also precodes the subsegment to facilitate subsequent linear filtering of the data in a receiver to minimize NTSC co-channel interference. The precoder output has three single bit leads that are coupled to a mapper 90 where the individual symbol information is mapped to selected transmission levels for facilitating transmission of the appropriate signal amplitudes.

Figure 2:
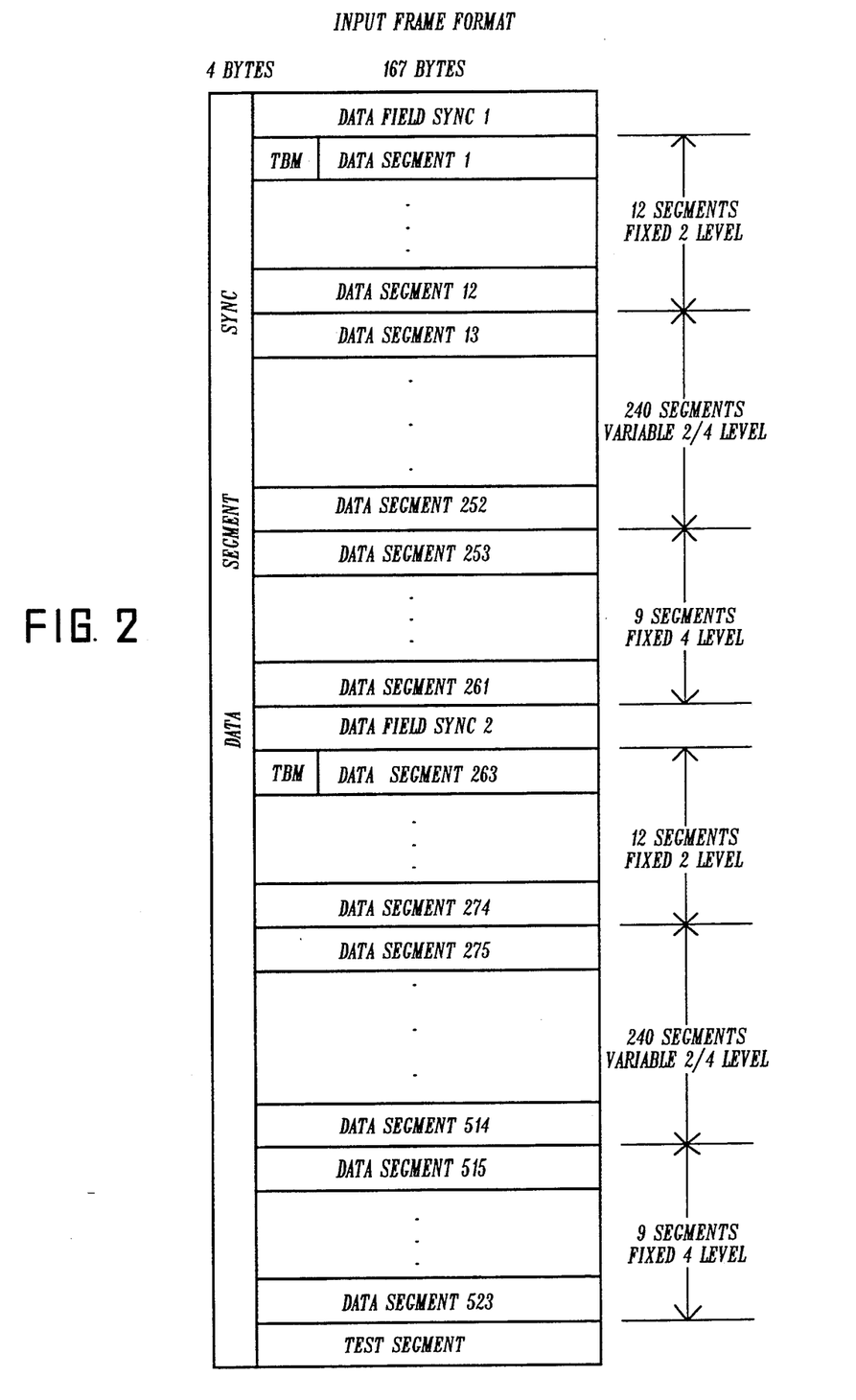
FIG. 2 is a simplified diagram illustrating the format of an input frame of birate symbol information prior to being formatted for transmission.

In FIG. 2, the input data frame format is illustrated. The two fields are identified as data field 1 and data field 2. The data segment sync is common to all data segments in both fields and is included in the initial four bytes of information in each data segment. The four bytes comprise four data sync symbols and 12 offset symbols, with one offset symbol for each of the subsequent 12 subsegments of the data segment. Each of the four initial bytes of data in each segment is followed by 167 bytes of information consisting of 147 bytes of data and 20 bytes of Reed-Solomon correction or parity bytes. The first data segment in each data field comprises a field sync which is a pseudo random sequence of two level symbols. This is followed by 12 segments of 2-level symbols which include the TBM (transmission bit map). The TBM, it will be recalled, comprises one bit for each pair of the next 240 data segments or 15 bytes (120 bits total) of information, with each bit defining whether the data segment pair contains two level or four level symbols. In the preferred system, the two level and four level symbol variability is constrained by the requirement that contiguous pairs of data segments contain either all two level or all four level symbols. As mentioned, the initial 12 data segments contain only two level symbols. Therefore the "more important" data in a field is sent in two level symbol form to assure its integrity. As the video information is compressed prior to transmission, the components thereof which are most important in reconstructing the video data in the receiver, are preferably sent as 2-level symbols in the first 12 data segments. The following 240 data segments comprise either two or four level symbols, as discussed above, and these are followed by nine data segments of four level symbols.

FIG. 3 illustrates the arrangement of the various data segments of the input signal in the first field. The data segments are indicated by the letters DS and a number, i.e. DS0, DS1, DS2 . . . DS129. The subsegments are designated by the letters SS and a number from 0 to 11 since there are 12 subsegments in a data segment. Each subsegment includes 56 symbols.

FIG. 4 illustrates the algorithm used by field interleavers 40 and 50 to map the input data field (FIG. 3) to an output data field (FIG. 4). The illustrated mapping strategy essentially addresses two forms of interference expected to be encountered during transmission of the data. The first form of interference comprises burst noise and this is addressed by rearranging the data subsegments throughout the half-field such that, upon reconstruction of the field in a receiver (i.e. de-interleaving), the effects of the burst noise will be scattered throughout the entire half-field of reproduced data. The second form of interference comprises NTSC co-channel interference which is expected to be highly vertically correlated. As will be described in further detail hereinafter, the Reed-Solomon error correction system used to correct errors in the received signal is byte based, having the capability of correcting all errors in a predetermined number of bytes of each received data segment. It is therefore highly advantageous to group as many errors as possible into the same received byte thereby providing optimum error correction efficiency. This is facilitated according to the invention by reorienting the data subsegments so that the constituent symbols thereof are more exposed to the effects of the expected interference. Therefore, in the case of NTSC co-channel interference, which is expected to be highly correlated in a vertical direction, the data subsegments are oriented in vertical alignment for increased exposure to the interference. In this manner, error correction efficiency in the receiver is increased by packing errors caused by the co-channel interference into common bytes. The interleaving selected is a compromise between protection against burst errors, the expected vertically oriented NTSC co-channel interference and the R-S correction system.

A major constraint on interleaving results from the birate transmission system and the particular type of precoding system used in the DSC-HDTV system. The system is birate, in that it has both two and four level symbols and it uses modulo 4 precoding which enables a linear comb filter in a receiver to greatly minimize certain types of interference from NTSC co-channel signals.

Referring again to FIGS. 4 and 5, the half-field interleaving will be explained in more detail. Symbol errors (due to noise and the like) must be expected. When a transmission data segment is corrupted by burst noise, many of the symbols in that data segment may be in error, since the noise tends to spread across the data segment, e.g. is horizontally oriented. To guard against burst noise corrupting an entire segment, each data segment is divided into subsegments that are swapped or interleaved with other subsegments in the (half) field. Thus, data segment 0 (DS0) has 12 subsegments SS0 to SS11 (as shown in FIG. 3). The subsegments of each data segment are swapped in the half field to distribute them on different lines in the half field as illustrated in FIG. 4. Thus the first line includes subsegments from DS0, DS2, DS110, DS112, etc. Burst noise-caused symbol errors are thus spread out (when the transmission frame is deinterleaved in the receiver). Large bursts may also cause errors in consecutive data segments so the subsegments from the same data segment are spaced apart by a number of data segments in the half field.

As mentioned, a predominant source of interference is expected to be from co-channel NTSC and horizontal sync and video, which will create vertically correlated errors. The invention reduces the effect of such errors by placing symbols in the same input byte in vertical alignment in two successive transmission data segments. The vertically oriented noise affects the now vertically oriented symbols of the subsegment and when the received signal is deinterleaved, the symbol errors will be placed into the same byte. The multiple symbols in a subsegment are placed into two successive data segments and double-sized subsegments are required to fill the independently coded parts of both data segments. Thus a data segment can only be divided into 6 subsegments for transmission. The independent subsegments of a data segment are therefore spread 20 lines or data segments apart in the transmission frame.

Figure 5:
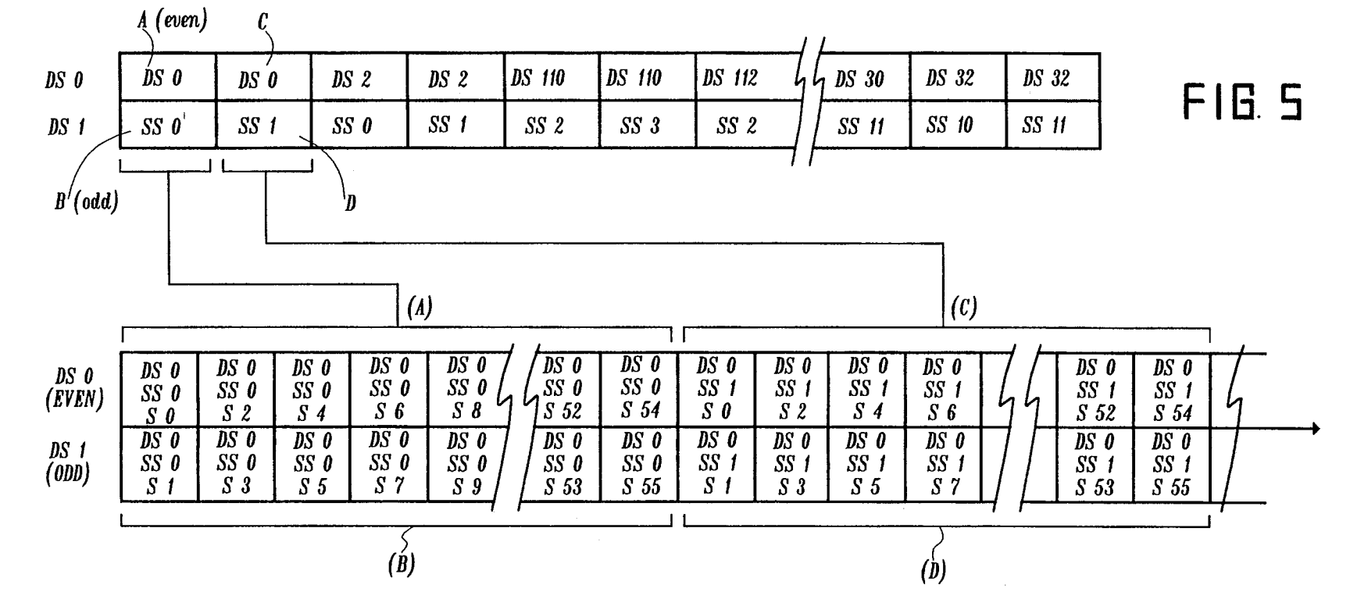
FIG. 5 is an expanded view of a pair of subsegments of FIG. 4.

FIG. 4 (and the expanded view thereof in FIG. 5) illustrates this vertical correlation process. Specifically, FIG. 5 shows an expanded view of the initial subsegments of the first two data segments in the two line interleaved arrangement of FIG. 4. The individual symbols of the subsegments are further divided into even and odd symbols. Thus data segment 0, subsegment 0 is split into even (A) and odd (B) symbols. Data segment 0 (DS0 even) has the symbols S0, S2, S4, S6, S8 ... S54 from subsegment 0 of data segment 0 and data segment 1 (DS1 odd) has the symbols S1, S3, S5 ... S55 from subsegment 0 of data segment 0. Similarly, subsegment 1 of data segment 0 is divided into even (C) and odd (D) symbols, with symbols S0, S2, S4 ... S54 from subsegment 0 of data segment 1 being in the DS0 (even) line and symbols S1, S3 ... S55 from subsegment 0 of data segment 0 being in the DS1 (odd) line.

Figure 6:
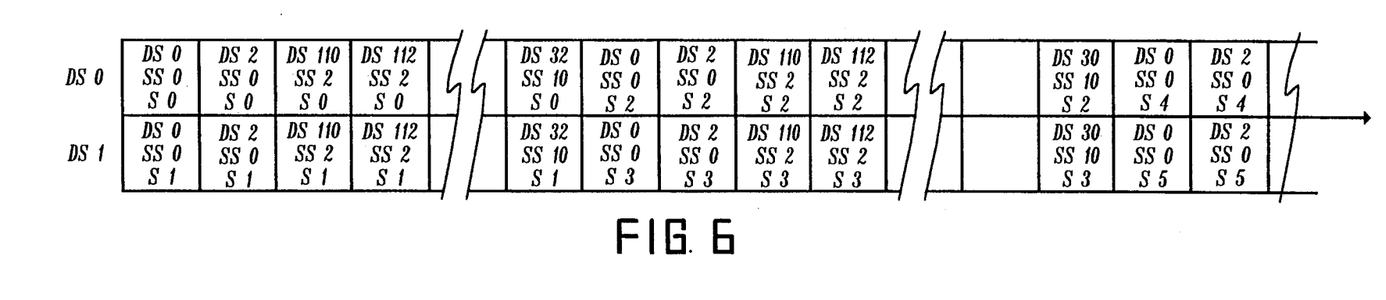
FIG. 6 is a partial illustration of line interleaving of the symbols for transmission in the transmission format.

It will be recalled that modulo 4 precoding has a feedback delay of 12 symbols. Therefore each of the 12 independent subsegments in a data segment is arranged to precode within itself only. This is accomplished by spreading the individual symbols of a subsegment by 12 across the transmission data segment so one subsegment, for example, has symbols 0, 12, 24, 36 and the next subsegment has symbols 1, 13, 25, 37, etc. This is referred to as line interleaving. Line interleaving thus consists of grouping the first symbols of each subsegment in a single subsegment, grouping the second symbols of each subsegment in the next subsegment, etc. as partially illustrated in FIG. 6. This is grouping by 12. Note that the first symbol (0) of each subsegment in data segment 0 is grouped (DS0, SS0 to DS32, SS10) followed by the second symbols of each subsegment, etc. The complete listing of input symbols and their location in the transmission frame is as follows:

Half-field Interleaving Map
Pairs of transmitted segments and the original segment locations of their subsegments

| destinations even, odd: | subsegment numbers | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0, 1: | 0 | 2 | 110 | 112 | 90 | 92 | 70 | 72 | 50 | 52 | 30 | 32 |
| 2, 3: | 4 | 6 | 114 | 116 | 94 | 96 | 74 | 76 | 54 | 56 | 34 | 36 |
| 4, 5: | 1 | 8 | 111 | 118 | 91 | 98 | 71 | 78 | 51 | 58 | 31 | 38 |
| 6, 7: | 3 | 5 | 113 | 115 | 93 | 95 | 73 | 75 | 53 | 55 | 33 | 35 |
| 8, 9: | 7 | 9 | 117 | 119 | 97 | 99 | 77 | 79 | 57 | 59 | 37 | 39 |
| 10, 11: | 10 | 12 | 120 | 122 | 100 | 102 | 80 | 82 | 60 | 62 | 40 | 42 |
| 12, 13: | 14 | 16 | 124 | 126 | 104 | 106 | 84 | 86 | 64 | 66 | 44 | 46 |
| 14, 15: | 11 | 18 | 121 | 128 | 101 | 108 | 81 | 88 | 61 | 68 | 41 | 48 |
| 16, 17: | 13 | 15 | 123 | 125 | 103 | 105 | 83 | 85 | 63 | 65 | 43 | 45 |
| 18, 19: | 17 | 19 | 127 | 129 | 107 | 109 | 87 | 89 | 67 | 69 | 47 | 49 |
| 20, 21: | 20 | 22 | 0 | 2 | 110 | 112 | 90 | 92 | 70 | 72 | 50 | 52 |
| 22, 23: | 24 | 26 | 4 | 6 | 114 | 116 | 94 | 96 | 74 | 76 | 54 | 56 |
| 24, 25: | 21 | 28 | 1 | 8 | 111 | 118 | 91 | 98 | 71 | 78 | 51 | 58 |
| 26, 27: | 23 | 25 | 3 | 5 | 113 | 115 | 93 | 95 | 73 | 75 | 53 | 55 |
| 28, 29: | 27 | 29 | 7 | 9 | 117 | 119 | 97 | 99 | 77 | 79 | 55 | 59 |
| 30, 31: | 30 | 32 | 10 | 12 | 120 | 122 | 100 | 102 | 80 | 82 | 60 | 62 |
| 32, 33: | 34 | 36 | 14 | 16 | 124 | 126 | 104 | 106 | 84 | 86 | 64 | 66 |
| 34, 35: | 31 | 38 | 11 | 18 | 121 | 128 | 101 | 108 | 81 | 88 | 61 | 68 |
| 36, 37: | 33 | 35 | 13 | 15 | 123 | 125 | 103 | 105 | 83 | 85 | 63 | 65 |
| 38, 39: | 37 | 39 | 17 | 19 | 127 | 129 | 107 | 109 | 87 | 89 | 67 | 69 |
| 40, 41: | 40 | 42 | 20 | 22 | 0 | 2 | 110 | 112 | 90 | 92 | 70 | 72 |
| 42, 43: | 44 | 46 | 24 | 26 | 4 | 6 | 114 | 116 | 94 | 96 | 74 | 76 |
| 44, 45: | 41 | 48 | 21 | 28 | 1 | 8 | 111 | 118 | 91 | 98 | 71 | 78 |
| 46, 47: | 43 | 45 | 23 | 25 | 3 | 5 | 113 | 115 | 93 | 95 | 73 | 75 |
| 48, 49: | 47 | 49 | 27 | 29 | 7 | 9 | 117 | 119 | 97 | 99 | 77 | 79 |
| 50, 51: | 50 | 52 | 30 | 32 | 10 | 12 | 120 | 122 | 100 | 102 | 80 | 82 |
| 52, 53: | 54 | 56 | 34 | 36 | 14 | 16 | 124 | 126 | 104 | 106 | 84 | 86 |
| 54, 55: | 51 | 58 | 31 | 38 | 11 | 18 | 121 | 128 | 101 | 108 | 81 | 88 |
| 56, 57: | 53 | 55 | 33 | 35 | 13 | 15 | 123 | 125 | 103 | 105 | 83 | 85 |
| 58, 59: | 57 | 59 | 37 | 39 | 17 | 19 | 127 | 129 | 107 | 109 | 87 | 89 |
| 60, 61: | 60 | 62 | 40 | 42 | 20 | 22. | 0 | 2 | 110 | 112 | 90 | 92 |
| 62, 63: | 64 | 66 | 44 | 46 | 24 | 26 | 4 | 6 | 114 | 116 | 94 | 96 |
| 64, 65: | 61 | 68 | 41 | 48 | 21 | 28 | 1 | 8 | 111 | 118 | 91 | 98 |
| 66, 67: | 63 | 65 | 43 | 45 | 23 | 25 | 3 | 5 | 113 | 115 | 93 | 95 |
| 68, 69: | 67 | 69 | 47 | 49 | 27 | 29 | 7 | 9 | 117 | 119 | 97 | 99 |
| 70, 71: | 70 | 72 | 50 | 52 | 30 | 32 | 10 | 12 | 120 | 122 | 100 | 102 |
| 72, 73: | 74 | 76 | 54 | 56 | 34 | 36 | 14 | 16 | 124 | 126 | 104 | 106 |
| 74, 75: | 71 | 78 | 51 | 58 | 31 | 38 | 11 | 18 | 121 | 128 | 101 | 108 |
| 76, 77: | 73 | 75 | 53 | 55 | 33 | 35 | 13 | 15 | 123 | 125 | 103 | 105 |
| 78, 79: | 77 | 79 | 57 | 59 | 37 | 39 | 17 | 19 | 127 | 129 | 107 | 109 |
| 80, 81: | 80 | 82 | 60 | 62 | 40 | 42 | 20 | 22 | 0 | 2 | 110 | 112 |
| 82, 83: | 84 | 86 | 64 | 66 | 44 | 46 | 24 | 26 | 4 | 6 | 114 | 116 |
| 84, 85: | 81 | 88 | 61 | 68 | 41 | 48 | 21 | 28 | 1 | 8 | 111 | 118 |
| 86, 87: | 83 | 85 | 63 | 65 | 43 | 45 | 23 | 25 | 3 | 5 | 113 | 115 |
| 88, 89: | 87 | 89 | 67 | 69 | 47 | 49 | 27 | 29 | 7 | 9 | 117 | 119 |

-continued

Half-field Interleaving Map
Pairs of transmitted segments and the original segment
locations of their subsegments

| destinations even, odd: | subsegment numbers | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 90, 91: | 90 | 92 | 70 | 72 | 50 | 52 | 30 | 32 | 10 | 12 | 120 | 122 |
| 92, 93: | 94 | 96 | 74 | 76 | 54 | 56 | 34 | 36 | 14 | 16 | 124 | 126 |
| 94, 95: | 91 | 98 | 71 | 78 | 51 | 58 | 31 | 38 | 11 | 18 | 121 | 128 |
| 96, 97: | 93 | 95 | 73 | 75 | 53 | 55 | 33 | 35 | 13 | 15 | 123 | 125 |
| 98, 99: | 97 | 99 | 77 | 79 | 57 | 59 | 37 | 39 | 17 | 19 | 127 | 129 |
| 100, 101: | 100 | 102 | 80 | 82 | 60 | 62 | 40 | 42 | 20 | 22 | 0 | 2 |
| 102, 103: | 104 | 106 | 84 | 86 | 64 | 66 | 44 | 46 | 24 | 26 | 4 | 6 |
| 104, 105: | 101 | 108 | 81 | 88 | 61 | 68 | 41 | 48 | 21 | 28 | 1 | 8 |
| 106, 107: | 103 | 105 | 83 | 85 | 63 | 65 | 43 | 45 | 23 | 25 | 3 | 5 |
| 108, 109: | 107 | 109 | 87 | 89 | 67 | 69 | 47 | 49 | 27 | 29 | 7 | 9 |
| 110, 111: | 110 | 112 | 90 | 92 | 70 | 72 | 50 | 52 | 30 | 32 | 10 | 12 |
| 112, 113: | 114 | 116 | 94 | 96 | 74 | 76 | 54 | 56 | 34 | 36 | 14 | 16 |
| 114, 115: | 111 | 118 | 91 | 98 | 71 | 78 | 51 | 58 | 31 | 38 | 11 | 18 |
| 116, 117: | 113 | 115 | 93 | 95 | 73 | 75 | 53 | 55 | 33 | 35 | 13 | 15 |
| 118, 119: | 117 | 119 | 97 | 99 | 77 | 79 | 57 | 59 | 37 | 39 | 17 | 19 |
| 120, 121: | 120 | 122 | 100 | 102 | 80 | 82 | 60 | 62 | 40 | 42 | 20 | 22 |
| 122, 123: | 124 | 126 | 104 | 106 | 84 | 86 | 64 | 66 | 44 | 46 | 24 | 26 |
| 124, 125: | 121 | 128 | 101 | 108 | 81 | 88 | 61 | 68 | 41 | 48 | 21 | 28 |
| 126, 127: | 123 | 125 | 103 | 105 | 83 | 85 | 63 | 65 | 43 | 45 | 23 | 25 |
| 128, 129: | 127 | 129 | 107 | 109 | 87 | 89 | 67 | 69 | 47 | 49 | 27 | 29 |
| 130: | 130 | 130 | 130 | 130 | 130 | 130 | 130 | 130 | 130 | 130 | 130 | 130 |

Ex: Transmitted segments 0 and 1 will contain information from:
segment   0 in subsegment   0, segment   2 in subsegment  1,
segment 110 in subsegment   2, segment 112 in subsegment  3,
segment  90 in subsegment   4, segment  92 in subsegment  5,
segment  70 in subsegment   6, segment  72 in subsegment  7,
segment  50 in subsegment   8, segment  52 in subsegment  9,
segment  30 in subsegment 10, segment  32 in subsegment 11.

As mentioned, an offset calculation is used to assure that the transmitted signal results in a pilot-like residue or remainder when it is recovered in the receiver. Essentially, the offset calculator determines the levels of the symbols in each subsegment and introduces an offset to those symbol levels (in a subsegment) to assure a certain remainder when that subsegment of symbols is recovered. That arrangement is not part of the present invention and is described in others of the copending applications referred to above.

Figure 7A:
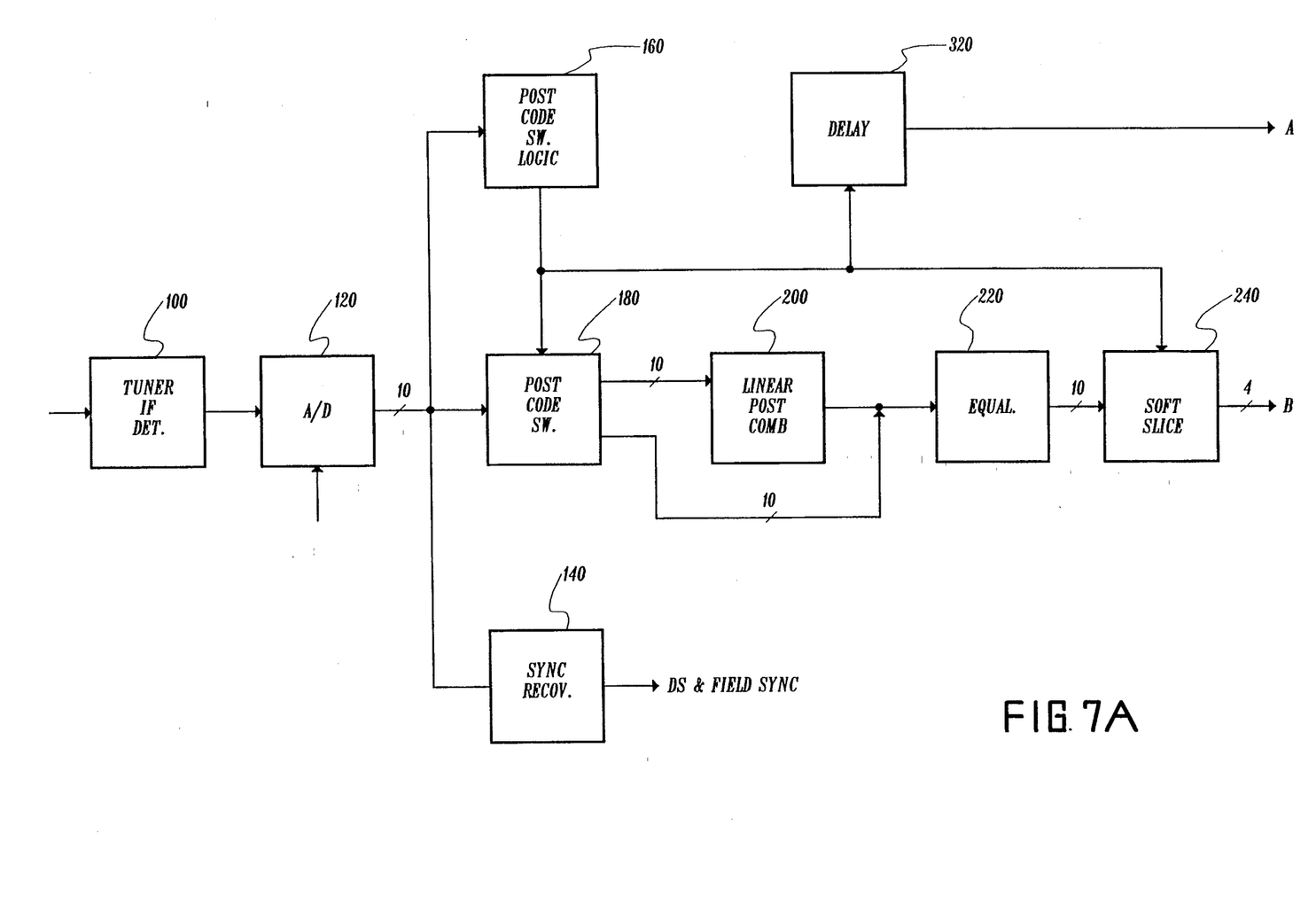
FIGS. 7A and 7B are a simplified block diagram of a receiver for processing the signals of the invention.
Figure 7B:
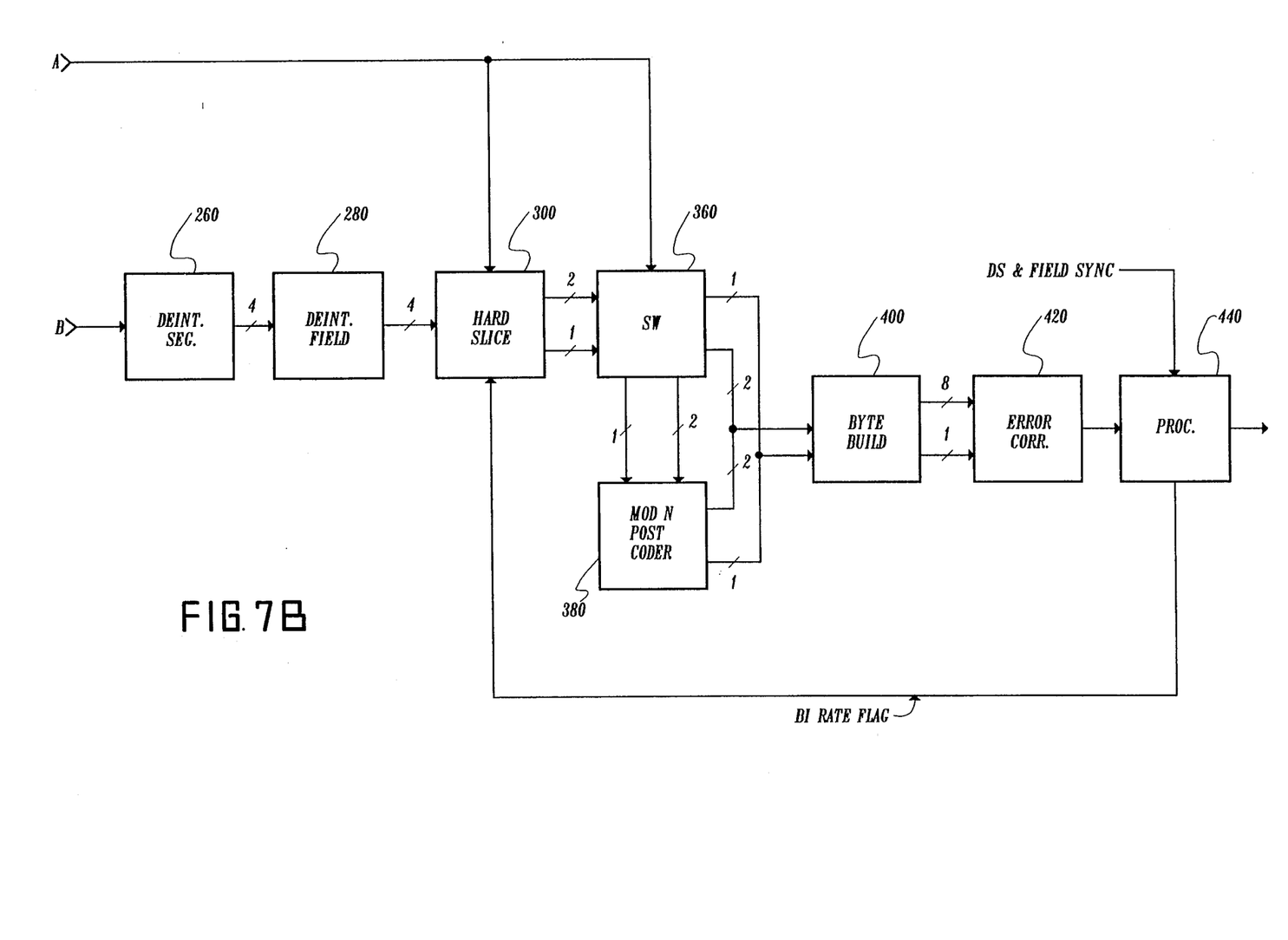

In FIGS. 7A and 7B, a received DSC-HDTV signal is converted by a tuner IF detector 100 to a baseband analog signal, which is applied to an analog-to-digital (A/D) converter 120. A/D converter 120 converts the received input information to a 10 bit digital signal which represents the amplitude of the incoming received modulo N precoded symbols. A/D converter 120 is coupled to a synchronizing signal recovery circuit 140 that operates in accordance with copending applications Ser. Nos. 894,388, filed Jun. 5, 1992, and 204,972, filed Mar. 2, 1994 above to recover the data segment sync and field sync signals used for timing in the receiver. The sync signal recovery function and other functions indicated in the various blocks are disclosed in detail in various of the copending applications mentioned above, but are not disclosed herein since they are not part of the present invention. A/D converter 120 is also coupled to a post code switching logic circuit 160 which functions in accordance with U.S. Pat. No. 5,260,793 above to determine whether the received signal is in the presence of a substantial interfering NTSC co-channel.

In the event that a substantial interfering NTSC co-channel is present, appropriate logic signals are sent to post code switch circuit 180, which is also supplied by A/D converter 120, to provide an output to a linear post comb circuit 200. In the event post code logic circuit 160 determines that there is minimal or no interference from NTSC co-channels (as determined by a preset threshold level), post code switch circuit 180 routes its 10 bit output around linear post comb circuit 200 to an equalizer 220. The linear post comb circuit 200 is used in the presence of NTSC co-channel interference since it effectively eliminates the harmful effects of the major portion of that interference. However, it does impose a signal-to-noise ratio reduction and also increases the number of levels characterizing the processed signals. Post code switch logic 160 generates a logic post code flag in the presence of NTSC co-channel interference (that exceeds the threshold level). The flag causes post code switch 180 to couple its 10 bit output to linear post comb filter 200. Filter 200 operates to develop a filtered 10 bit output signal with reduced co-channel interference (as fully discussed in U.S. Pat. No. 5,086,340) which is supplied to channel equalizer 220. Channel equalizer 220, among other operations, removes the DC component of the received signal. The output of post comb filter 200 comprises seven level symbols (representing received and filtered four level symbols) or three level symbols (representing received and filtered two level symbols), respectively. In the absence of significant NTSC co-channel interference (below the threshold), post code switch logic 160 develops a logic "0" post code flag that causes post code switch 180 to couple the 10 bit input symbols from A/D 120 directly to channel equalizer 220 and no increase in symbol levels occurs. The 10 bit output of channel equalizer 220 is supplied to a "soft" slice circuit 240 which executes appropriate bit reduction slicing as discussed in copending application U.S. Ser. No. 931,176, filed Aug. 17, 1992 in response to the logic "0" post code flag.

The four bit output of soft slicer 240 is applied to a line or data segment deinterleaving circuit 260, which output is in turn applied to a field deinterleaving circuit 280. These circuits, which function to deinterleave the intrasegment and intersegment symbols, are discussed in U.S. Pat. No. 5,136,375. The bit reduction (from 10 to 4) effected by soft slicer 240 allows the memory required to implement the deinterleaving circuits 260 and 280 to be reduced by a factor of 2½. Segment deinterleaver 260 groups subsegments into successive sequences of adjacent symbols and field deinterleaver 280 places each subsegment back into its proper data segment. The output of field deinterleaver 280 is supplied to a hard slicer 300 which also receives the post code flag through a delay circuit 320 and a birate flag that is contained in the received transmission bit map. The birate flag is received from processor 440 and functions in conjunction with the post code flag to properly slice the signals (see U.S. Pat. No. 5,136,375).

The output of hard slicer 300 and an error flag are applied to a switch 360 which is also operated in response to the post code flag from delay 320. A post code flag of "0" indicates that the received signals were not processed by linear comb filter 200 and they are therefore applied to a byte builder 400. A post code flag of "1" indicates that received signals were processed by linear comb filter 200 and the binary values from hard slicer 30 (and any error flag) are directly applied to byte builder 400.

Byte builder 400 thus receives the data and error flag from either switch 360 or post coder 380. Byte builder 400 groups the two bit binary values from switch 360 and post coder 380 into eight bit bytes for application to the R-S error correction circuit 420. Two level data takes eight transmission symbols per byte and four level data takes four transmission symbols per byte. Each byte is accompanied by a one bit error flag which represents an error in any of the symbols that comprise the associated byte. The corrected bytes from the Reed-Solomon corrector circuit 420 are applied to a processor 440 for further signal processing to reconstitute the high definition video, audio and other information.

In summary, the invention utilizes the fact that the type of interference to which the transmitted signal will be subject is known to be predominantly vertically oriented and arranges the interleaving to take advantage of that knowledge. The symbols of an input frame are arranged in subsegments and their vertical orientation is enhanced in the transmission frame by interleaving. Vertically oriented interference will thus tend to impact more than one symbol in a subsegment, resulting in multiple symbol errors being packed into the same data byte when the signal is deinterleaved in the receiver so that the Reed-Solomon correction system employed can operate more effectively.

While details of the system are given for the purposes of completeness and accuracy, it will be recognized that numerous changes and modifications in the described embodiment of the invention will occur to those skilled in the art without departing from its true spirit and scope. The invention is to be limited only as defined in the claims.

What is claimed is:

1. In a system having an input data frame comprising a plurality of successive input data segments, each said input data segment including a plurality of symbols arranged into a group of input subsegments of a given number of symbols and including an error protection code, potential interference with signals in said system expected to have a high degree of vertical correlation; means for formatting a transmission data frame for said signals wherein two or more symbols of an input subsegment are vertically correlated on different transmission data segments.

2. The system of claim 1 wherein said different transmission data segments comprise a pair of adjacent transmission data segments.

3. The system of claim 2 wherein each said input subsegment is split into pairs of symbols with the odd and the even symbols of each pair being vertically aligned in said transmission data frame.

4. The system of claim 3 wherein each of said input data segments comprises 12 contiguous input subsegments and wherein said input subsegments are interleaved in said transmission frame into different transmission data segments for also guarding against interference having a high degree of horizontal correlation.

5. The system of claim 4 wherein the symbols in each of said 12 input subsegments are spread over 12 contiguous subsegments in said transmission data segments to form 12 spread subsegments, said transmission data segments further including an initial subsegment of 12 symbols for determining an offset level for said 12 spread subsegments, respectively.

6. A television signal transmission system having a signal comprising transmission frames of successive horizontal transmission data segments, each including a plurality of transmission subsegments of a given number of symbols, said transmission subsegments being formed from input data subsegments, said signal being error protected and exposed to vertically oriented interference, said error protection being limited to correction of a maximum number of errors in a transmission data segment, the improvement comprising:
arranging said input data subsegments in said transmission frames so that symbols from the same input data subsegment are vertically oriented.

7. The system of claim 6 wherein said error protection system is based upon bytes of digital data and wherein said vertical orientation of said symbols in said transmission frames increases the likelihood that vertically oriented interference will affect a larger number of symbols in an affected input data subsegment and be packed into the same byte when said data is recovered and reconfigured into input data subsegments in a receiver.

8. A method of transmitting digital data in the environment of an interfering signal including an interfering component having a known predetermined characteristic, comprising:
providing an input digital data signal comprising a plurality of multibit constituent components;
reorienting each of said multibit constituent components in a manner related to said predetermined characteristic to increase the exposure thereof to said interfering component; and
transmitting said reoriented multibit constituent components.

9. The method of claim 8 wherein said interfering signal comprises an NTSC co-channel television signal comprising a plurality of successive lines of video information having a repetition rate H and wherein said reorienting step comprises separating each of said constituent components into portions and arranging said portions for transmission at spaced time intervals corresponding to 1/H.

10. The method of claim 9, further comprising:
receiving said transmitted components;

reconstructing said constituent components comprising said input digital data signal such that errors caused by said interfering component are relatively closely spaced; and error correcting said reconstructed constituent components.

11. A method of transmitting a digital HDTV signal on a channel which may be subject to interference from an NTSC co-channel signal, the NTSC co-channel signal comprising a plurality of successive lines of video information having a repetition rate H, comprising:

providing an input digital HDTV signal in the form of a plurality of data segments having a repetition rate H, each of said data segments comprising a plurality of multibit subsegments;

separating each of said multibit subsegments into first and second portions;

arranging said first and second portions of each of said multibit subsegments for transmission at a spaced time interval corresponding to 1/H; and transmitting said arranged first and second portions.

12. The method of claim 11 wherein each of said multibit subsegments represents a predetermined number of successive data symbols, said separating and arranging steps comprising separating the symbols of each of said multibit subsegments into first and second portions comprising the even and odd numbered symbols respectively of each of said subsegments and arranging each successive pair of even and odd numbered symbols for transmission at a spaced time interval corresponding to 1/H.

13. The method of claim 12, further comprising:

receiving said transmitted first and second portions;

reconstructing said multibit subsegments from said first and second portions such that errors caused by interference from said NTSC co-channel are relatively closely spaced; and error correcting said reconstructed multibit subsegments.

14. A method of receiving digital data having a plurality of multibit constituent components reoriented into transmission components in a transmission frame that are arranged to increase their exposure to an interfering component having a known predetermined characteristic, comprising:

receiving said transmission components;

reconstructing said constituent components comprising said digital data so that errors caused by said interfering component are relatively closely spaced; and error correcting said reconstructed constituent components.

15. The method of claim 14 wherein said predetermined characteristic is vertical orientation and wherein said transmission components include portions of said multibit constituent components in vertical alignment in said transmission frame.

16. A method of receiving a digital HDTV signal having a plurality of data segments having a repetition rate H, with each data segment comprising a plurality of multibit subsegments and being rearranged into first and second portions and transmitted at a spaced time interval of 1/H, comprising:

receiving said first and second portions;

reconstructing said multibit subsegments from said first and second portions; and error correcting said multibit subsegments.

17. A receiver for receiving transmission components in a transmission frame comprising digital data having a plurality of multibit constituent components rearranged to increase their exposure to an interfering component of predetermined characteristic, comprising:

means for receiving said transmission components;

means for reconstructing said multibit constituent components so that errors caused by said interfering component are relatively closely spaced; and means for error correcting said reconstructed multibit constituent components.

18. The receiver of claim 17 wherein said predetermined characteristic is vertical orientation and wherein said transmission components include portions of said multibit constituent components in vertical alignment in said transmission frame.

19. The receiver of claim 18 wherein said multibit constituent components each include a plurality of contiguous symbols and wherein one of said portions includes even numbered symbols and the other includes odd numbered symbols.

20. A receiver for receiving an HDTV signal having a plurality of data segments having a repetition rate H, with each data segment comprising a plurality of multibit subsegments being arranged into first and second portions and transmitted at a spaced time interval of 1/H, comprising:

means for receiving said first and second portions;

means for reconstructing said multibit subsegments from said first and second portions; and means for error correcting said multibit subsegments.

* * * * *